United States Patent Office 2,803,656
Patented Aug. 20, 1957

2,803,656

FLUOROCARBONSULFONAMIDOALKANOLS AND SULFATES THEREOF

Arthur H. Ahlbrecht, White Bear Township, Ramsey County, and Harvey A. Brown, Oakdale Township, Washington County, Minn., assignors to Minnesota Mining & Manufacturing Company, St. Paul, Minn., a corporation of Delaware No Drawing. Application January 23, 1956, Serial No. 560,899

3 Claims. (Cl. 260—556)

This invention relates to our discovery of a new and useful class of fluorocarbon alcohols which have utility as surface active and surface treating agents, and as chemical intermediates for making still other surface active and surface treating compounds, such as ester derivatives; although utility is not restricted thereto. The claimed invention includes the sulfate-acid and sulfate-salt esters of these alcohols, both of which may be referred to as sulfate esters.

More particularly, these novel alcohols are perfluoroalkanesulfonamido alkanols which have in the molecule a perfluorocarbon "tail" containing 4 to 12 fully fluorinated carbon atoms. These compounds may be termed N-alkanol perfluoroalkanesulfonamides and have the equivalent general formulas:

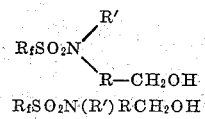

$$R_fSO_2N(R')RCH_2OH$$

wherein $R_f$ is a perfluoroalkyl group containing 4 to 12 carbon atoms (which provides the perfluorocarbon "tail"), R is an alkylene bridging group containing 1 to 12 carbon atoms, and R' is a hydrogen atom or an alkyl group containing 1 to 6 carbon atoms (methyl, ethyl, propyl, butyl, amyl or hexyl).

The corresponding sulfate-acid esters of these alcohols, which are half-esters of sulfuric acid, have the formula:

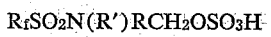

$$R_fSO_2N(R')RCH_2OSO_3H$$

The corresponding sulfate-salt esters, in which the hydrogen atom of the sulfate-acid group is replaced by a metal or ammonium substituent which neutralizes the half-ester to form a "soap" compound, have the formula:

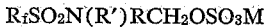

$$R_fSO_2N(R')RCH_2OSO_3M$$

where M is a metal or ammonium ion. Both types of sulfate esters are anionic surface active agents since the ester molecules are anionogenic, ionizing in aqueous solutions to provide sulfate anions having the formula:

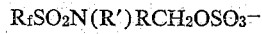

$$R_fSO_2N(R')RCH_2OSO_3^-$$

Since in the molecules of our alcohols the nitrogen atom is bonded to the sulfur atom of a sulfonyl group, the molecule has an internal amido structure. These alcohols may be regarded as derivatives of perfluoroalkanesulfonamides, $R_fSO_2NH_2$, in which one N-bonded hydrogen atom is replaced by an alkanol group

$$(—RCH_2OH)$$

and the other hydrogen atom may or may not be replaced by a short-chain alkyl group (R'). From this viewpoint the present fluorocarbon alcohols may be designated as N-hydroxyalkylated perfluoroalkanesulfonamides or as N-alkanol perfluoroalkanesulfonamides.

These fluorocarbon alcohols may also be regarded as N-substituted derivatives of alkanolamines, also known as amino-alkyl alcohols, having the formula

$$H_2N—R—CH_2OH$$

in which one N-bonded hydrogen atom is replaced by a perfluoroalkanesulfonyl group ($R_fSO_2—$) and the other hydrogen atom may or may not be replaced by a short-chain alkyl group. From this viewpoint they may be designated as N-perfluoroalkanesulfonyl alkanolamines.

Perfluoroalkanesulfonyl compounds useful as starting compounds for making the present alcohol compounds have been described in the copending application of T. J. Brice and P. W. Trott, S. N. 448,784, filed August 9, 1954, and since issued as U. S. Patent No. 2,732,398 on January 24, 1956.

An example of our fluorocarbon alcohols is N-propyl, N-ethanol perfluorooctanesulfonamide, having the formula:

$$C_8F_{17}SO_2N(C_3H_7)CH_2CH_2OH$$

This compound may be regarded either as a derivative of perfluorooctanesulfonamide ($C_8F_{17}SO_2NH_2$) as indicated by the above name, or as a derivative of ethanolamine ($H_2NCH_2CH_2OH$). It has a perfluoroalkyl type of perfluorocarbon "tail" containing eight fully fluorinated carbon atoms.

As is evident from the above formulas, the complete fluorocarbon alcohol molecule has an inert non-polar perfluorocarbon "tail" group ($R_f—$) at one end and a functional polar hydroxymethyl "head" group ($—CH_2OH$) at the other end, which are linked together by an interposed sulfonamidoalkylene "body" group

$$(—SO_2N(R')R—)$$

The corresponding sulfate esters have a functional polar "head" group in which the hydroxyl group has been replaced by a sulfate-acid group ($—OSO_3H$) or sulfate-salt group ($—OSO_3M$), respectively.

The functional "head" of the molecule provides a hydrophilic solubilizing terminal structure which renders the molecule sufficiently soluble in water and other hydroxylated or oxygenated solvents to permit of functioning therein as a surface active agent. This polar group also provides a means for bonding the molecule to a substrate surface when the compound is employed for surface treatment. Thus in the treatment of hydrophilic materials, such as paper, cloth, leather, metals, lithic materials, ceramic articles and glass, a solution of a fluorocarbon compound can be prepared which is useful for treating the surface to provide (upon evaporation of the solvent) a thin coating of oriented molecules, the polar heads being bonded to the substrate with the tails projecting to provide a fluorocarbon-like outer surface that is repellent to water, oils and greases. Drops of water and drops of oil deposited on the surface will remain or run off rather than spreading and wetting the surface.

The hydroxylated "head" of the alcohol molecules also provides a reactive group to enable the preparation of many derivatives which are derivable from long-chain alcohol compounds, as will be evident to those skilled in the art of alcohol derivatives. In particular, the present fluorocarbon alcohols can be employed in making a wide variety of ester derivatives by reaction with acid compounds, in addition to the sulfate esters mentioned above. Acrylate and methacrylate esters provide polymerizable monomers useful in making novel and useful polymers, as described in the companion application of ourselves and Samuel Smith, filed of even date herewith, S. N. 560,900.

It is of critical importance that the sulfonyl-bonded perfluorocarbon "tail" contain at least four carbon atoms, and the preferred number is six to ten. A terminal fluorocarbon chain of this minimum length is required in order to insolubilize and render both hydrophobic and oleophobic the perfluoroalkanesulfonamido end of the molecule.

The perfluorocarbon "tail" structure may include an oxygen atom linking together two perfluorinated carbon atoms, or a nitrogen atom linking together three perfluorinated carbon atoms, since these linkages are very stable and do not impair the inert and stable fluorocarbon characteristic of the structure (cf., U. S. Patents Nos. 2,500,-388 and 2,616,927).

The perfluorocarbon "tail" of the molecule is inert, non-polar, and is both hydrophobic and oleophobic. It is repellent not only to water but to oils and hydrocarbons. It imparts unique surface active and surface treating properties not possessed by corresponding compounds having a hydrocarbon tail, the latter being oleophilic and highly soluble in oils and hydrocarbons. The invention provides surface active agents having a high degree of stability and that can be employed in minute concentration for reducing the surface tension of aqueous and non-aqueous systems, and as emulsifying and dispersing agents, etc.

The length of the bridging alkylene group, represented by —R— in the preceding formulas, can be varied to thereby modify solubility and surface properties. Increase in length of this hydrocarbon structure serves to increase solubility of the molecule in hydrocarbon media, and to decrease solubility in water, as well as to space the terminal structures of the molecule farther apart. The N-substituted alkyl side group (R' in preceding formulas) can be employed and varied to further increase solubility in hydrocarbon media and to decrease solubility in water, as compared to molecules wherein R' is a hydrogen atom. The replacement of the hydroxyl group of the alcohols by an acyloxy group (in acyl esters) further reduces solubility in water and enhances solubility in oils; making possible ester molecules which are hydrophobic and oleophobic at the fluorocarbon end, and hydrophobic and oleophilic at the hydrocarbon end.

Thus the general molecular structure of the present compounds can be varied to obtain compounds having specifically different characteristics, so that a fluorocarbon alcohol or an ester derivative having optimum properties for a given end use can be selected.

We have found that our perfluoroalkanesulfonamido alkanol compounds can be readily prepared in good yields by reaction of a halohydrin with a sodium or potassium salt of the corresponding perfluoroalkanesulfonamide:

$$R_fSO_2N(R')A + XRCH_2OH \rightarrow R_fSO_2N(R')RCH_2OH$$

where A is sodium or potassium, X is chlorine or bromine, and $R_f$, R and R' have the meanings previously stated. Instead of employing a halohydrin, use may be made of the corresponding acetate ester.

The use of this process is illustrated by the following representative experimental examples which include further information on the properties of the subject compounds:

Example 1

This example illustrates the preparation of substantial quantities of N-propyl, N-ethanol perfluorooctanesulfonamide, and its acrylate ester derivative.

The fluorocarbon starting compound was perfluorooctanesulfonyl fluoride, $C_8F_{17}SO_2F$, which was purified by washing twice with pyridine, followed by a dilute hydrochloric acid wash and a water wash, drying over magnesium sulfate, treatment with decolorizing activated carbon, and filtering.

A 22 liter Pyrex glass flask equipped with a thermometer, stirrer and distilling head, was successively charged with 7,200 grams of isopropyl ether, 1,600 grams (27 moles) of N-propylamine, and then with 4,544 grams (9.05 moles) of the purified sulfonyl fluoride starting compound which was added over a period of 1½ hours with constant stirring to maintain the temperature at 25–30° C. The reaction mixture was stirred for 3 hours at 30° C. and for 2 hours at 40° C. After cooling to room temperature, the mixture was washed with 4,500 grams of 9% aqueous hydrochloric acid solution. The phases separated upon standing and the lower (aqueous) layer was siphoned off. The product layer was rewashed with 4,500 grams of an aqueous solution containing 4.5% hydrochloric acid and 4% ferrous sulfate, and the aqueous phase was removed. The reaction flask was fitted with a distilling head, and the ether was removed by distillation under reduced pressure at a water bath temperature of 70–80° C., yielding 4,648 grams of N-propyl perfluorooctanesulfonamide:

$$C_8F_{17}SO_2N(C_3H_7)H$$

The sodium salt was prepared by dissolving 4,608 grams of this amide product in 4,600 ml. of absolute methanol, adding 474 grams of sodium methoxide ($CH_3ONa$) in 2,300 ml. of absolute methanol, and removing the alcohol by distillation of the reaction mixture under reduced pressure at a bath temperature of 70–80° C. The yield of dry salt product was 4,482 grams.

A 12 liter Pyrex glass flask equipped with a thermometer, stirrer and distilling head, was charged with 4,797 grams of the aforesaid dry sodium salt and 741 grams of ethylene chlorohydrin ($ClCH_2CH_2OH$) was added, the mole ratio of chlorohydrin to salt being 1.1 to 1. The mixture was heated until viscous enough for stirring and was then heated with constant stirring for 5 hours at 110–115° C. A sample of the reaction product was withdrawn and titrated for free sulfonamide and salt content, showing that 10.1% amide and 5.3% salt remained unreacted. Addition was made of 60.5 grams of sodium methoxide in 300 ml. of absolute methanol to neutralize the sulfonamide present. Heating and stirring were continued and the methanol was distilled off to a pot temperature of 120° C. Then a further 188 grams of chlorohydrin was added and heating was continued for 6 hours at 115° C. The reaction mixture was cooled to 40° C. and 7,200 ml. of diethyl ether and 220 grams of decolorizing activated carbon were added. The mixture was stirred and heated at reflux for one-half hour, cooled to room temperature, and filtered with suction. The filtrate was charged to a separatory flask fitted with a bottom take-off and washed successively with 2,800 ml. of water, 2,800 ml. of aqueous 5% sodium hydroxide solution, and 2,800 ml. of water. The washed ether solution was returned to the reaction flask, which was fitted with a distilling head, and the ether was distilled off under reduced pressure, yielding 4,090 grams of product, identified as relatively pure N-propyl, N-ethanol perfluorooctanesulfonamide:

$$C_8F_{17}SO_2N(C_3H_7)CH_2CH_2OH$$

analysis indicated that the product contained 4.5% unreacted amide and 1% unreacted amide salt.

This alkanol product was a light-tan waxy solid material having a vacuum boiling point of 120–126° C. at 0.5 mm. and a melting point of 48–55° C. It is only slightly soluble in water at room temperature (solubility of less than 0.1%). Addition of 0.1% to water reduced the surface tension to 36 dynes/cm. at 25° C. It is sparingly to moderately soluble in acetone, methanol, ethanol, isopropanol, diethyl ether, isopropyl ether, benzene and toluene, and is readily soluble in xylene hexafluoride and benzotrifluoride. Surfaces coated with this alkanol compound are rendered both water-repellent and oil-repellent.

The preparation of the acrylate ester is illustrated by the following: A 12 liter Pyrex glass flask equipped with a thermometer, stirrer, and two Barrett traps fitted with water-cooled reflux condensers (to serve as azeotrope separators), was charged with 3,960 grams of the aforesaid alkanol product (6.77 moles), 15 grams of copper flakes, 3,000 ml. of benzene, 580.5 grams of acrylic acid (8.2 moles), and 30 grams of concentrated sulfuric acid. The mixture was heated to reflux and over a period of 7½ hours a total of 125 ml. of water was recovered in the Barrett traps from the benzene azeotrope, which was approximately the theoretical amount. The solution was cooled to 20° C. and the excess acrylic acid and sulfuric acid were neutralized by addition of 300 grams of calcium hydroxide. Addition was made of 50 grams of decolorizing activated carbon and after stirring for half an hour the mixture was suction filtered through a Buchner funnel. The filtrate was then treated with 750 grams of cationic type ion exchange resin ("Amberlite" IRA 120) for 1½ hours to reduce the copper content, and was filtered. This filtrate was vacuum distilled at a pot temperature of 45–50° C. to remove the benzene, yielding 4,140 grams of acrylate ester product:

$$C_8F_{17}SO_2N(C_3H_7)CH_2CH_2OCOCH=CH_2$$

This product was a light-brown liquid material. It provides a useful polymerizable monomer that can readily be polymerized inter se in the presence of a peroxide or persulfate catalyst by bulk, solution or emulsion procedures to form a water-repellent and oil-repellent solid flexible thermoplastic homopolymer having notable utility for sizing fabrics and papers to impart a high degree of resistance to water, oils and greases.

*Example 2*

A 5 liter Pyrex glass flask equipped with a thermometer, stirrer, and distilling head serving as a reflux condenser, was charged with 2,655 grams of the dry sodium salt of N-butyl perfluoroocetanesulfonamide:

$$C_8F_{17}SO_2N(C_4H_9)Na$$

which had been prepared in a manner similar to that described above. Addition was made of 360 grams of ethylene chlorohydrin and the mixture was heated at 115° C. with constant stirring for 8 hours and was then cooled to room temperature. Addition was made of 32.1 grams of sodium methoxide dissolved in 280 ml. of absolute methanol to convert any unreacted amide present in the mixture to the sodium salt. The methanol was removed by distillation and the mixture was cooled. Then 162 additional grams of ethylene chlorohydrin was added and the mixture was heated slowly so as to reach a temperature of 115° C. at the end of 14 hours. Upon cooling, 2500 ml. of ethanol was added, and the mixture was heated to 45° C. and agitated to put the alcohol in solution. The solution was filtered and 125 grams of decolorizing activated carbon was added and thoroughly mixed in. The mixture was heated to reflux and filtered hot. The methanol was distilled off, leaving 2,698 grams of crude alkanol product.

This product was taken up in 3,000 ml. of ethyl ether and washed in a separatory flask with 1,500 ml. of water, then with 1,500 ml. of 5% aqueous sodium hydroxide solution, and then with 1,500 ml. of water. The aqueous wash solutions were washed with ethyl ether and the ether extracts were combined with the ether solution of the product. The combined solution was evaporated to dryness under vacuum, yielding 1,936 grams of purified N-butyl, N-ethanol perfluorooctanesulfonamide:

$$C_8F_{17}SO_2N(C_4H_9)CH_2CH_2OH$$

The product was a brown waxy solid material having a vacuum boiling point of 115–117° C. at 0.175 mm. and a melting point of 47–49.5° C. It is only slightly soluble in water at room temperature but is sparingly to moderately soluble in benzene, toluene, methanol, ethanol, isopropanol, ether and acetone. It is readily soluble in xylene hexafluoride and benzotrifluoride.

*Example 3*

A flask was charged with 1.3 grams of potassium hydroxide in 15 ml. of ethyl alcohol, and with 10.4 grams of N-ethyl perfluorooctanesulfonamide, $$C_8F_{17}SO_2N(C_2H_5)H$$

and the mixture reacted to form the sulfonamide potassium salt. Then 1.6 grams of ethylene chlorohydrin was added and the mixture was refluxed for 3 hours. Upon cooling, the mixture was filtered to remove solid potassium chloride, and was evaporated to dryness. The dry material was mixed with 100 ml. of 10% aqueous sodium hydroxide solution and extracted with ether. The ether extract was evaporated to dryness, yielding 8.4 grams of solid material, which was then sublimed to yield 6.4 grams of sublimate, having a melting range of 67–74° C. The product was identified as relatively pure N-ethyl, N-ethanol perfluorooctanesulfonamide:

$$C_8F_{17}SO_2N(C_2H_5)CH_2CH_2OH$$

Sodium fusion indicated that no chloride was present. Analysis showed 56.7% fluorine (56.6% calc.) and 2.45% nitrogen (2.45% calc.). The infrared absorption spectrum was consistent with the assigned structure.

This alkanol product compound is only slightly soluble in water but sufficiently so to exhibit strong surface active properties in aqueous solution. The surface tension of pure water at 25° C. is 72 dynes/cm. Addition to pure water of 0.1% by weight of this compound reduced the surface tension to 17 dynes/cm.

The butyrate ester of this alcohol compound:

$$C_8F_{17}SO_2(C_2H_5)CH_2CH_2OOCC_3H_7$$

was prepared and found to have a melting point of 32–35° C., a boiling point of 312° C. (at 760 mm.), a viscosity of 27.04 centistokes at 100° F. and 3.27 centistokes at 210° F., a flash point of 341° F. and a fire point of 354° F. It was highly resistant to hydrolysis. Addition of 0.1% to water lowered the surface tension to 38.6 dynes/cm. at 25° C. This ester is only slightly soluble in water and is only sparingly soluble in fluorocarbon solvents such as benzotrifluoride, perfluorooctane, perfluoro tertiary amines, and perfluoro ethers. It is soluble to the extent of at least 10% in benzene, toluene, methyl ethyl ketone, isopropanol, acetone and ether. The properties of this ester suggest suitability as a high temperature synthetic lubricant or lubricant additive.

The phosphate ester:

$$(C_8F_{17}SO_2N(C_2H_5)CH_2CH_2O)_3PO$$

was prepared by reaction of the alkanol with POCl₃ in benzene and pyridine. It was found to be insoluble in water, fluorocarbon solvents, and various common organic solvents, but it was soluble in acetone and in acetic acid. It is a brittle transparent solid. Analysis showed 1.90% P (1.76% calc.).

Reaction of the alkanol compound with adipic acid gave the adipate ester:

$$(C_8F_{17}SO_2N(C_2H_5)CH_2CH_2O)_2(OC(CH_2)_4CO)$$

having a melting point of 92–94° C. Analysis showed 2.22% N (2.28% calc.).

Sulfate-acid and sulfate-salt esters of this alkanol compound were made as follows: A flask was charged with 28.55 grams of the alkanol and 5.80 grams of chlorosulfonic acid (ClSO₃H) and the mixture was heated over a Bunsen burner. The mixture foamed up and was poured into a crucible which was heated until the foaming stopped. The product was poured into a flask where it cooled to form a dark, waxy solid, identified as the sulfate-acid ester of the alkanol starting compound:

$$C_8F_{17}SO_2N(C_2H_5)CH_2CH_2OSO_3H$$

The corresponding sodium salt of the ester was made by neutralizing with sodium hydroxide until the product was just basic to phenolphthalein, and it was then dried, yielding the desired:

$$C_8F_{17}SO_2N(C_2H_5)CH_2CH_2OSO_3Na$$

It is sparingly soluble in water and in isopropanol. The high degree of surface activity is indicated by the fact that addition of only 0.01% to water lowered the surface tension to 19 dynes/cm. at 25° C., while addition of only 0.001% (10 p. p. m.) lowered the surface tension to 38 dynes/cm.

*Example 4*

A flask was charged with a solution of 1.6 grams of sodium in 50 ml. of methanol, to which was added 35 grams of N-ethyl perfluoroocetanesulfonamide, the latter becoming neutralized to form the corresponding sodium salt. The methanol was removed by evaporation. Then 30 ml. of acetone was added, followed by 15 grams of 6-bromo 1-hexanol, $Br(CH_2)_6OH$. The mixture was gently refluxed for 32 hours, filtered, and the filtrate subjected to fractional distillation under vacuum. The cut boiling at 130–135° C. at 0.025 mm. was identified as relatively pure N-ethyl, N-hexanol perfluorooctanesulfonamide:

$$C_8F_{17}SO_2N(C_2H_5)(CH_2)_5CH_2OH$$

It was a colorless viscous oily material at normal room temperature, melting at 22° C., and was highly isoluble in water. Analysis showed 51.3% F (51.8% calc.) and 2.16% N (2.24% calc.).

A small Claisen flask was charged with 6.27 grams of the above compound and with 2.80 grams of 1,1-dihydroperfluorobutyl sulfuric acid $(C_3F_7CH_2OSO_3H)$. The mixture was heated at 110° C. in an oil bath until 2 grams of 1,1-dihydroperfluorobutyl alcohol $$(C_3F_7CH_2OH)$$

B. P. 95° C., had distilled out and been collected. The heating was stopped and the residue was added to 25 ml. of water containing 0.4 gram of sodium hydroxide to neutralize the sulfate-acid ester product, resulting in an aqueous solution of the desired sulfate-salt ester:

$$C_8F_{17}SO_2N(C_2H_5)(CH_2)_5CH_2OSO_3Na$$

The surface activity of this "soap" product is illustrated by the fact that a mixture of one part of the above solution with 10 parts of water, when shaken, resulted in a stable foam.

*Example 5*

A flask was charged with a solution of 1.15 grams of sodium in 50 ml. of methanol, to which was added 26.3 grams of N-ethyl perfluorooctanesulfonamide, the latter becoming neutralized to form the corresponding sodium salt. The methanol was removed by distillation. Addition was made of a solution of 50 ml. of acetone containing 12.5 grams of dry 11-bromo 1-undecanol, $Br(CH_2)_{11}OH$, and 20 grams of benzene was added. The mixture was gently refluxed for 18 hours, filtered, and the volatiles were removed by evaporation at reduced pressure. Fractional distillation under vacuum yielded 24 grams of a cut boiling at 160–167° C.. at 0.1 mm., which was identified as N-ethyl, N-undecanol perfluorooctanesulfonamide:

$$C_8F_{17}SO_2N(C_2H_5)(CH_2)_{10}CH_2OH$$

It was a soft unctuous material at room temperature, melting at 30° C., and was highly insoluble in water. Analysis showed 46.7% F (46.5% calc.) and 2.03% N (2.01% calc.).

*Example 6*

A flask was charged with 60 grams of N-methyl perfluorooctanesulfonamide dissolved in acetone, which was exactly neutralized with a solution of sodium methoxide in methanol to form the corresponding sodium salt. The alcohol and acetone were evaporated off under reduced pressure and the sodium salt was dissolved in actone. Addition was made of 33 grams of dry 11-bromo 1-undecanol, $Br(CH_2)_{11}OH$, dissolved in 50 ml. of benzene, and the mixture was gently refluxed for 16 hours, filtered, and the volatiles were removed by evaporation at reduced pressure. Fraction distillation yielded 57.7 grams of product identified as N-methyl, N-undecanol perfluorooctanesulfonamide:

$$C_8F_{17}SO_2N(CH_3)(CH_2)_{10}CH_2OH$$

It was a white waxy material which melted at 86–88° C. and was highly insoluble in water. Analysis showed 48.2% F (47.4% calc.) and 2.01% N (2.05% calc.).

*Example 7*

A flask was charged with 31.3 grams of N-methyl perfluorobutanesulfonamide, $C_4F_9SO_2N(CH_3)H$, and then with a solution of 5.4 grams of sodium methoxide in 150 ml. of methanol. The methanol was distilled off and two 50 ml. portions of benzene were successively added and distilled off to remove all of the methanol. The dry sodium salt was obtained by heating the residue on a steam bath. Then 30 grams of 4-bromobutyl acetate, $Br(CH_2)_4OCOCH_3$, was added to the dry sodium salt and the mixture was heated on a steam bath for 2 hours, cooled, and diluted with 100 ml. of methanol to dissolve sodium bromide, followed by addition of 150 ml. of water and 12 grams of sodium hydroxide. The mixture was refluxed for 2 hours, cooled, diluted with 150 ml. of water, neutralized with hydrochloric acid, and extracted with ether. The ether phase was evaporated to dryness and fractionally distilled under vacuum to yield 30.6 grams of a cut boiling at 110–132° C. at 0.25 mm. (most of the cut boiling at 120–132° C.). The product was a colorless viscous liquid at normal room temperature, which was identified as N-methyl, N-butanol perfluorobutanesulfonamide:

$$C_4F_9SO_2N(CH_3)(CHC_2)_3CH_2OH$$

Titration against a standard sodium hydroxide solution showed that the product contained approximately 6% of the starting amide, which remained unreacted.

*Example 8*

A flask equipped with a reflux condenser was charged with a solution of 49.9 grams (0.1 mole) of perfluorooctanesulfonamide in 100 ml. of methanol, and addition was made of 5.4 grams of sodium methoxide (0.1 mole). The sodium salt product was isolated by distilling off the methanol and drying the residue under vacuum on a steam bath. Then 8.55 grams (0.11 mole) of ethylene chlorohydrin was added to the dry salt and the mixture was heated on an oil bath at 150–160° C for 4½ hours. After cooling, 100 ml. of methanol was added and the insoluble material (mainly sodium chloride) was filtered off. The methanol was then evaporated and the residue was distilled under reduced pressure to obtain a fraction boiling at 130–135° C. at 0.07 mm. External heating was necessary to melt the material which solidified in the distilling head and condenser. Recrystallization of this crude product from carbon tetrachloride containing a small proportion of ethanol yielded a purified product having a melting point of 115–119° C. which was identified as N-ethanol perfluorooctanesulfonamide:

$$C_8F_{17}SO_2NHCH_2CH_2OH$$

This material was found to be nearly insoluble in hot carbon tetrachloride. Titration (non-aqueous) with standard base indicated that it was about 98% pure.

We claim:

1. The new and useful fluorocarbon compounds of the class consisting of N-alkanol perfluoroalkanesulfonamides having the formula:

$$R_fSO_2N(R')RCH_2OH$$

wherein $R_f$ is a perfluoroalkyl group containing 4 to 12 carbon atoms, R is an alkylene bridging group containing 1 to 12 carbon atoms, and R' is of the class consisting of a hydrogen atom and of alkyl groups containing 1 to 6 carbon atoms; and the corresponding sulfate esters thereof.

2. N-propyl, N-ethanol perfluorooctanesulfonamide, having the formula:

$$C_8F_{17}SO_2N(C_3H_7)CH_2CH_2OH$$

3. N-butyl, N-ethanol perfluorooctanesulfonamide, having the formula:

$$C_8F_{17}SO_2N(C_4H_9)CH_2CH_2OH$$

References Cited in the file of this patent

UNITED STATES PATENTS

| | | |
|---|---|---|
| 2,403,207 | Barrick | July 2, 1946 |
| 2,732,398 | Brice | Jan. 24, 1956 |